(12) United States Patent
Hatayama et al.

(10) Patent No.: US 6,643,431 B2
(45) Date of Patent: Nov. 4, 2003

(54) OPTICAL DEVICE AND CONTROL METHOD THEREOF

(75) Inventors: Hitoshi Hatayama, Yokohama (JP);
Chisai Hirose, Yokohama (JP);
Masayuki Nishimura, Yokohama (JP);
Makoto Katayama, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 26 days.

(21) Appl. No.: 10/096,535

(22) Filed: Mar. 13, 2002

(65) Prior Publication Data

US 2002/0164124 A1 Nov. 7, 2002

(30) Foreign Application Priority Data

Mar. 13, 2001 (JP) ......................... 2001-070577

(51) Int. Cl.[7] .............................. G02B 6/26; G02B 6/12; G02F 1/025
(52) U.S. Cl. .............................. 385/39; 385/15; 385/14; 385/1
(58) Field of Search .............................. 385/1–3, 8–11, 385/14, 15, 39–41

(56) References Cited

U.S. PATENT DOCUMENTS 6,240,221 B1 * 5/2001 Thompson ................ 385/14
6,333,807 B1 * 12/2001 Hatayama et al. ......... 359/308
6,560,381 B2 * 5/2003 Hatayama et al. ......... 385/15

OTHER PUBLICATIONS

C.R. Doerr, et al., "Dynamic Wavelength Equalizer in Silica Using the Single–Filtered Interferometer", IEEE Photonics Technology Letter, vol. 11, No. 5, pp. 581–583, (1999).

* cited by examiner

Primary Examiner—Brian Healy
Assistant Examiner—Sarah U Song
(74) Attorney, Agent, or Firm—McDermott, Will & Emery

(57) ABSTRACT

A main optical path and an auxiliary optical path which are formed in a substrate are optically coupled to each other with a plurality of optical couplers, so as to constitute a Mach-Zehnder interferometer. By controlling the temperature regulation of main and auxiliary optical paths effected by heaters, a control unit regulates the transmissivity of light across an optical input end and an optical output end. Respective optical path lengths of the main and auxiliary optical paths are set so as to lower birefringence when optical loss becomes greater.

4 Claims, 4 Drawing Sheets

OPTICAL DEVICE AND CONTROL METHOD THEREOF

BACKGROUND OF THE INVENTION

1. Field of the Invention

The present invention relates to an optical device of Mach-Zehnder interferometer type which can adjust a transmission characteristic by regulating the temperature of an optical path.

2. Related Background Art

An optical device of Mach-Zehnder interferometer type comprises a main optical path for guiding light from an optical input end to an optical output end, and an auxiliary optical path optically coupled to the main optical path with first and second optical couplers. Also, this optical device comprises temperature adjusting means (e.g., a heater, a Peltier device, and the like) for regulating the temperature of one or both of the main and auxiliary optical paths between the first and second optical couplers, and can adjust a transmission characteristic by this temperature regulation. Such an optical device can be used, for example, as a gain equalizer for equalizing the gain of an optical amplifier (see, for example, a literature—C. R. Doerr, et al., "Dynamic Wavelength Equalizer in Silica Using the Single-Filtered Interferometer", IEEE Photonics Technology Letters, Vol. 11, No. 5, pp. 581–583(1999)).

SUMMARY OF THE INVENTION

However, conventional optical devices of Mach-Zehnder interferometer type have the following problem. Namely, birefringence occurs in the main optical path or auxiliary optical path due to the temperature regulation effected by the temperature adjusting means, whereby the transmissivity of light across the optical input end and the optical output end varies depending on polarization. Therefore, the optical device yields polarization-dependent loss (PDL), thereby deteriorating a transmission characteristic.

In order to overcome the following problem, it is an object of the present invention to provide an optical device having an excellent transmission characteristic by lowering PDL.

The optical device in accordance with the present invention is an optical device of Mach-Zehnder interferometer type comprising a main optical path for guiding light from an optical input end to an optical output end; an auxiliary optical path disposed beside the main optical path; first to third optical couplers for optically coupling the main and auxiliary optical paths to each other; temperature adjusting means, disposed on the main and auxiliary optical paths between the first and second optical couplers and between the second and third optical couplers, for regulating respective temperatures of the optical paths; and control means for regulating an optical loss characteristic of transmitted light within a predetermined wavelength band in the main optical path by controlling respective amounts of temperature regulation effected by the temperature adjusting means; wherein respective optical path lengths of the main and auxiliary optical paths are set such that birefringence generated upon temperature regulation effected by the temperature adjusting means becomes smaller when optical loss is greater.

The optical device control method in accordance with the present invention is a method of controlling an optical loss characteristic of the above-mentioned optical device, the method comprising the step of regulating the optical loss characteristic by controlling a difference in amounts of temperature regulation effected by respective temperature adjusting means on the main and auxiliary optical paths between the first and second optical couplers, and a difference in amounts of temperature regulation effected by respective temperature adjusting means on the main and auxiliary optical paths between the second and third optical couplers.

Such a configuration lowers birefringence in both optical paths when optical loss is large, which suppresses the dependence of transmissivity upon polarization, whereby PDL can be reduced.

It will be preferred if the respective temperature adjusting means disposed on the main and auxiliary optical paths between the first and second optical couplers have the same configuration, and the respective temperature adjusting means disposed on the main and auxiliary optical paths between the second and third optical couplers have the same configuration, since it facilitates the control.

BRIEF DESCRIPTION OF THE DRAWINGS

FIG. 2 is a graph showing results of experiments in loss characteristics of the optical device in accordance with a comparative example, whereas

DESCRIPTION OF THE PREFERRED EMBODIMENTS

Figure 1:
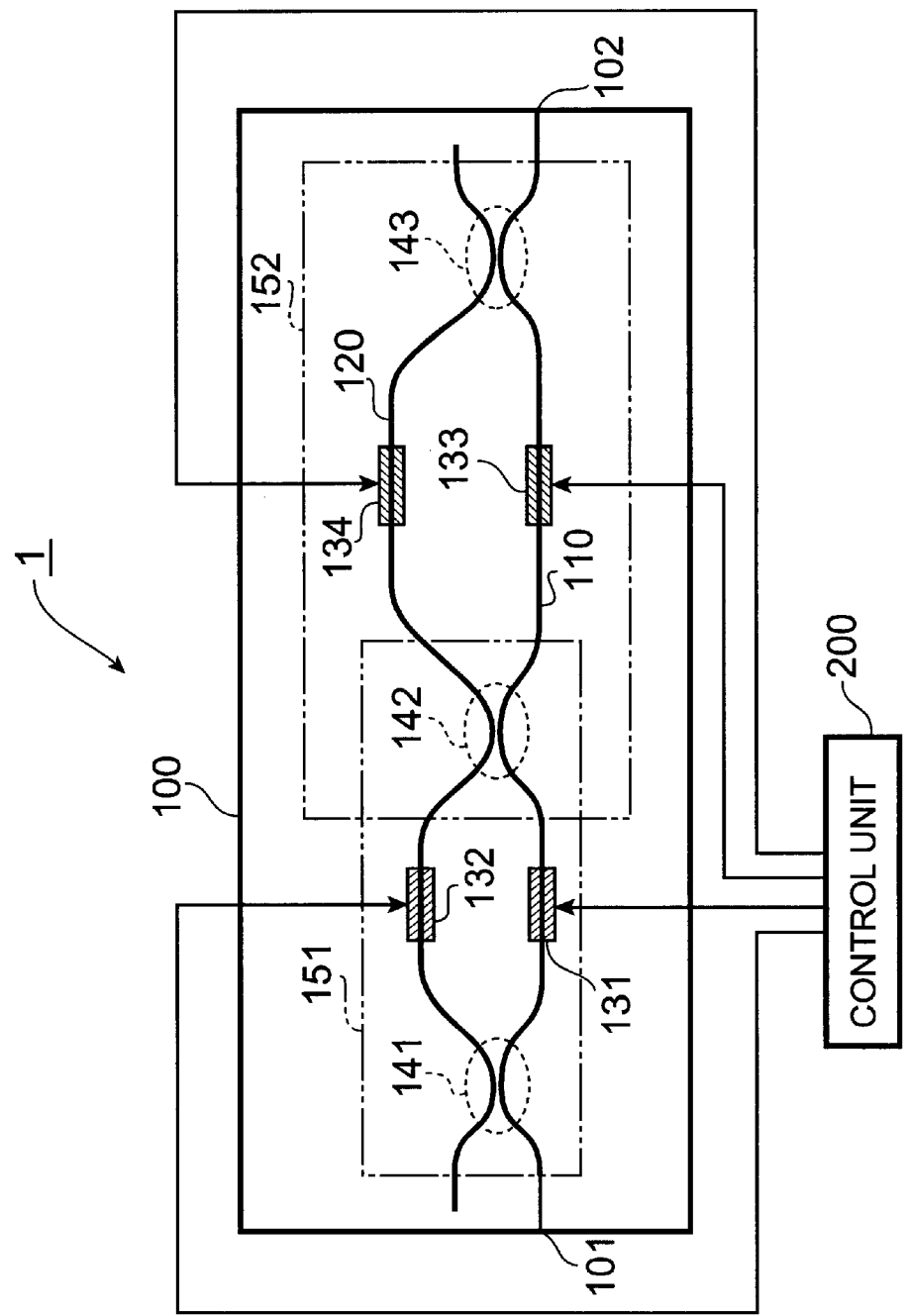
FIG. 1 is a schematic view of an optical device 1 in accordance with the present invention.

In the following, embodiments of the present invention will be explained in detail with reference to the accompanying drawings. To facilitate the comprehension of the explanation, the same reference numerals denote the same parts, where possible, throughout the drawings, and a repeated explanation will be omitted.

FIG. 1 is a schematic view of an optical device 1 in accordance with an embodiment. This optical device 1 comprises a main optical path 110, an auxiliary optical path 120, heaters 131 to 134, and a control unit 200. Each of the main optical path 110 and the auxiliary optical path 120 is an optical waveguide formed in a substrate 100. The main optical path 110 is an optical path disposed between an optical input end 101 located at one end face of the substrate 100 and an optical output end 102 located at the other end face thereof. A first optical coupler 141, a second optical coupler 142, and a third optical coupler 143 are provided successively from the optical input end 101 to the optical output end 102. The main optical path 110 and the auxiliary optical path 120 are optically coupled to each other by way of the first optical coupler 141, second optical coupler 142, and third optical coupler 143. As a consequence, the main optical path 110, auxiliary optical path 120, first optical coupler 141, and second optical coupler 142 constitute a first Mach-Zehnder interferometer 151. Also, the main optical path 110, auxiliary optical path 120, second optical coupler 142, and third optical coupler 143 constitute a second Mach-Zehnder interferometer 152.

The heater 131 is disposed on the main optical path 110 between the first optical coupler 141 and second optical coupler 142, and regulates the phase shift amount of the main optical path 110 by adjusting the temperature of the main optical path 110. The heater 132 is disposed on the auxiliary optical path 120 between the first optical coupler 141 and second optical coupler 142, and regulates the phase shift amount of the auxiliary optical path 120 by adjusting the temperature of the auxiliary optical path 120. The heater 133 is disposed on the main optical path 110 between the second optical coupler 142 and third optical coupler 143, and regulates the phase shift amount of the main optical path 110 by adjusting the temperature of the main optical path 110. The heater 134 is disposed on the auxiliary optical path 120 between the second optical coupler 142 and third optical coupler 143, and regulates the phase shift amount of the auxiliary optical path 120 by adjusting the temperature of the auxiliary optical path 120. As a consequence, the transmissivity of light across the optical input end 101 and the optical output end 102 is regulated.

The transmissivity $T(\lambda)$ of light from the optical input end 101 to the optical output end 102 in the optical device 1 depends on the wavelength $\lambda$ of light, the difference $\Delta L_1$ between the respective optical path lengths of the main optical path 110 and auxiliary optical path 120 between the first optical coupler 141 and second optical coupler 142, the difference $\Delta L_2$ between the respective optical path lengths of the main optical path 110 and auxiliary optical path 120 between the second optical coupler 142 and third optical coupler 143, the respective power coupling ratios $C_1$ to $C_3$ at the optical couplers 141 to 143, the phase shift amount $\Delta \Phi_1$ of light in the first Mach-Zehnder interferometer 151 generated due to the fact that the respective temperatures of the main optical path 110 and auxiliary optical path 120 are regulated by the heaters 131 and 132, the phase shift amount $\Delta \Phi_2$ of light in the second Mach-Zehnder interferometer 152 generated due to the fact that the respective temperatures of the main optical path 110 and auxiliary optical path 120 are regulated by the heaters 133 and 134, and the effective refractive index n of each of the main optical path 110 and auxiliary optical path 120.

The transmissivity $T(\lambda)$ of the optical device 1 is represented by the following equations:

$$T(\lambda) = \qquad (1)$$
$$1 - C - C_3 + 2CC_3 - 2\sqrt{CC_3(C-1)(C_3-1)} \cos\left(\frac{2\pi n}{\lambda}\Delta L_2 - \Delta\phi_2\right)$$
$$C = 1 - C_1 - C_2 + 2C_1 C_2 -$$
$$2\sqrt{C_1 C_2 (C_1 - 1)(C_2 - 1)} \cos\left(\frac{2\pi n}{\lambda}\Delta L_2 - \Delta\phi_1\right)$$

where C is the power coupling ratio of light in a single optical coupler when the Mach-Zehnder interferometer 151 is assumed to be the single optical coupler. By regulating the temperature adjustment effected by each of the heaters 131 to 134, the control unit 200 adjusts the transmissivity $T(\lambda)$ of light across the optical input end 101 and the optical output end 102 in the optical device 1, thereby controlling the gradient of loss in light in a predetermined wavelength band.

Meanwhile, each of TE-polarized light and TM-polarized light is guided through each of the main optical path 110 and auxiliary optical path 120. The effective refractive index $n_{TE}$ for TE-polarized light and the effective refractive index $n_{TM}$ for TM-polarized light differ from each other as temperature is raised by the heaters 131 to 134. For example, the substrate 100 is assumed to be made of silica glass having a refractive index of 1.4440. It is assumed that each of the main optical path 110 and auxiliary line 120 is one, doped with $GeO_2$ and distanced from the heaters 131 to 134 by 25 $\mu$m, having a rectangular cross section (7 $\mu$m×7 $\mu$m) and a refractive index of 1.4505. Here, assuming the temperature of each heater to be 110° C., the birefringence $B(=n_{TM}-n_{TE})$ is $5.8\times10^{-6}$.

When such birefringence occurs, the transmissivity of light across the optical input end 101 and the optical output end 102 varies depending on polarization. Namely, if the value of effective refractive index n in the right side of the above-mentioned equations (1) differs between the TE polarization and TM polarization, the transmissivity $T(\lambda)$ represented by the above-mentioned equations (1) will vary as well. In general, letting $T_{TE}(\lambda)$ be the transmissivity for TE-polarized light, and $T_{TM}(\lambda)$ be the transmissivity for TM-polarized light, PDL of the optical device represented by the equation of $$PDL = -10 \log\left(\frac{T_{TE}}{T_{TM}}\right) \qquad (2)$$

increases as the birefringence B is greater (where $T_{TM} \geq T_{TE}$). Further, the following can be stated in view of the above-mentioned equation (2). Namely, PDL becomes greater as transmissivity is lower. For example, assuming the difference in transmissivity between two kinds of polarization ($T_{TM}-T_{TE}$) to be 0.01, PDL=0.049 when $T_{TM}$=0.9, and PDL=0.458 when $T_{TM}$=0.1.

Also, it is assumed that the length of the heaters 131, 133 provided on the main optical path 110 (length along the optical axis of the main optical path 110) is $L_1$, and the birefringence of the main optical path 110 caused by temperature regulation is $B_1$. Similarly, it is assumed that the length of the heaters 132, 134 provided on the auxiliary optical path 120 (length along the optical axis of the auxiliary optical path 120) is $L_2$, and the birefringence of the main optical path 120 caused by temperature regulation is $B_2$. In this case, the difference between the phase shift amount $\Delta\Phi_{TM}$ of TM-polarized light and the phase shift amount $\Delta\Phi_{TE}$ of TE-polarized light, i.e., the phase difference between two kinds of polarization, is represented by the equation of $$\Delta\varphi_{TM} - \Delta\varphi_{TE} = \frac{2\pi}{\lambda}(L_1 B_1 - L_2 B_2). \qquad (3)$$

This phase difference between two kinds of polarization generates a difference in transmissivity between two kinds of polarization, thereby deteriorating PDL.

Hence, in this embodiment, the optical path lengths of the main optical path and auxiliary optical path are set such that the difference in birefringence between optical paths generated upon the temperature regulation effected by the heaters 131 to 134 becomes smaller when transmissivity is lower (optical loss is greater), so that the phase difference between two kinds of polarization (absolute value of the above-mentioned equation (3)) becomes smaller. In general, according to the above-mentioned equation (2), PDL becomes smaller and greater as transmissivity is higher and lower, respectively. When the optical path lengths are set as mentioned above, the inter-polarization phase difference ($\Delta\Phi_{TM}-\Delta\Phi_{TE}$) becomes smaller when transmissivity is lower, i.e., when optical loss is greater, whereby PDL is restrained from increasing. Here, when the heater 131 on the main optical path 110 and the heater 132 on the auxiliary optical path 120 have similar configurations, while the heater 133 on the main optical path 110 and the heater 134 on the auxiliary optical path 120 have similar configurations, the control unit 200 makes the difference between the respective temperature regulation amounts of the heaters 131 and 132 smaller and the difference between the respective temperature regulation amounts of the heaters 133 and 134 smaller as transmissivity is lower, so as to reduce the difference between the birefringence $B_1$ of the main optical path 110 and the birefringence $B_2$ of the auxiliary optical path 120, which are generated by temperature regulation, thereby reducing the phase difference between two kinds of polarization caused by the temperature regulation.

Figure 2:
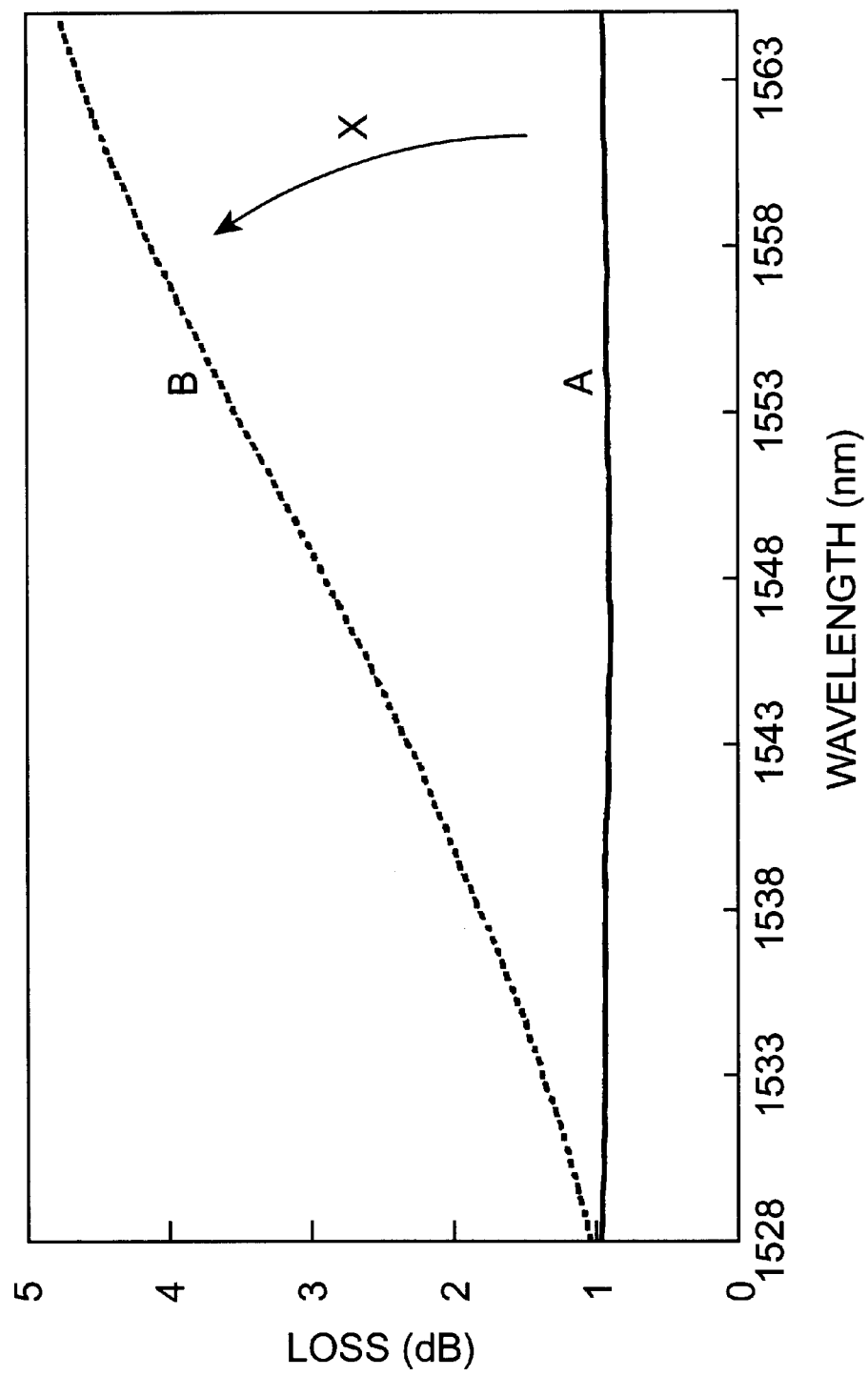
Figure 3:
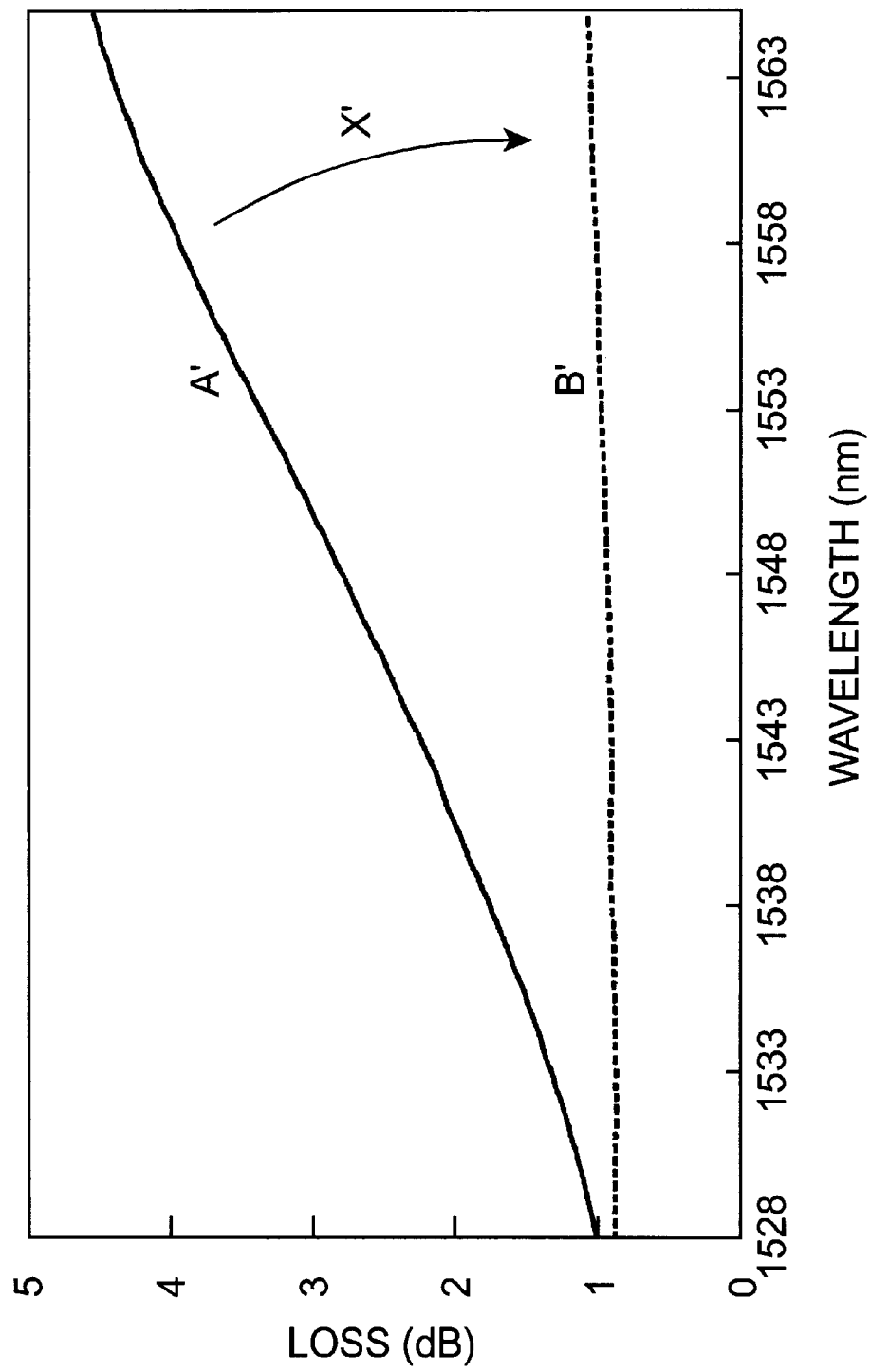
FIG. 3 is a graph showing results of experiments in loss characteristics of the optical device of FIG. 1.
Figure 4:
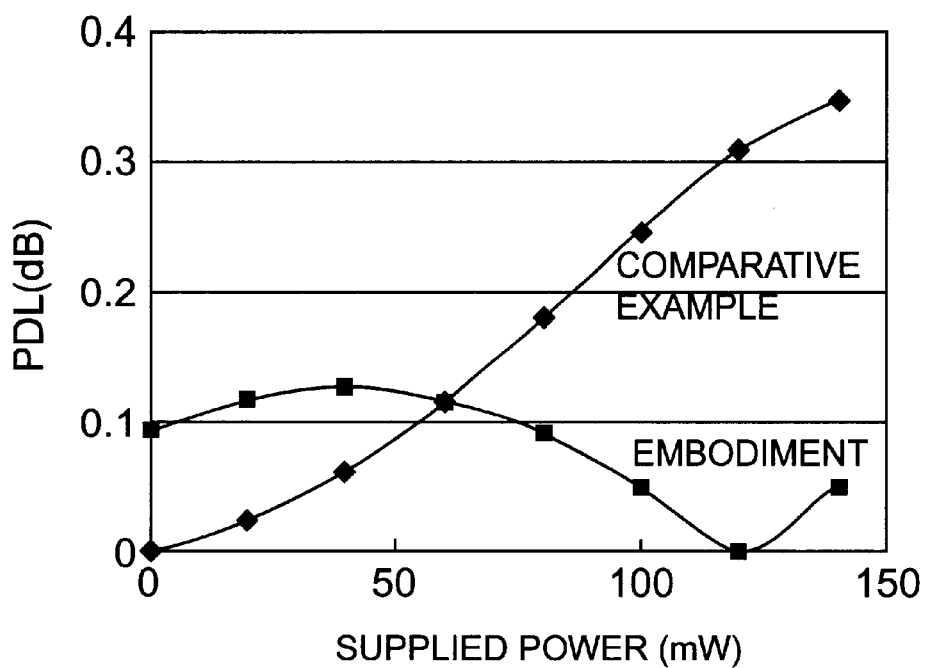
FIG. 4 is a graph showing respective relationships between supplied power and polarization-dependent loss in the optical device of the comparative example and the optical device 1 of FIG. 1.

FIG. 2 is a graph showing results of experiments in loss characteristics of an optical device of a comparative example. FIG. 3 is a graph showing results of experiments in loss characteristics of the optical device 1 in accordance with this embodiment. FIG. 4 is a graph showing respective relationships between supplied power and polarization-dependent loss in the optical device of the comparative example and the optical device 1 in accordance with this embodiment.

The optical device of the comparative example has substantially the same configuration as that of the optical device 1 in accordance with the embodiment shown in FIG. 1 but differs therefrom in the difference $\Delta L_1$ between the respective optical path lengths of the main optical path 110 and auxiliary optical path 120 between the first optical coupler 141 and second optical coupler 142 and the difference $\Delta L_2$ between the respective optical path lengths of the main optical path 110 and auxiliary optical path 120 between the second optical coupler 142 and third optical coupler 143. When no power is supplied to any heater in the optical device of the comparative example, loss is small in a certain wavelength band, regardless of wavelength, as indicated by A in FIG. 2. When a power of 150 mW is supplied to the heaters 132, 133, loss increases as wavelength is longer as indicated by B in FIG. 2, thereby enhancing the gradient of loss. Namely, the power supplied to the heater 132 is enhanced, so as to shift the gradient of loss as indicated by arrow X in the graph, i.e., to enhance the gradient of loss.

In the optical device of the comparative example, while loss increases (transmissivity decreases) upon heating with the heaters 132, 133, the birefringence $B_1$ of the main optical path 110 and the birefringence $B_2$ of the auxiliary optical path 120, which are caused by temperature regulation, become greater, so that the phase difference between two kinds of polarization caused by the temperature regulation increases, whereby PDL deteriorates (see FIG. 4).

In the optical device 1 of this embodiment, by contrast, loss becomes greater as wavelength is longer in a certain wavelength band as indicated by A' in FIG. 3 when no power is supplied to any heater, thereby enhancing the gradient of loss. When a power of 150 mW is supplied to the heaters 131, 134 while no power is supplied to the heaters 132, 133 in the optical device 1 of this embodiment, loss is small in a certain wavelength band regardless of wavelength as indicated by B' in FIG. 3. When a power of 150 mW is supplied not only to the heaters 131, 134 but also to the heaters 132, 133 in the optical device 1 of this embodiment, loss becomes greater as wavelength is longer in a certain wavelength band as indicated by A' in FIG. 3, thereby enhancing the gradient of loss. Namely, in each of a pair of heaters 131, 132 and a pair of heaters 133, 134, the difference in heating amounts therewithin is enhanced, so as to shift the gradient of loss as indicated by arrow X' in the graph, i.e., to flatten the gradient of loss. As a result, the difference between the birefringence $B_1$ of the main optical path 110 and the birefringence $B_2$ of the auxiliary optical path 120 becomes smaller when the gradient of loss is greater, so as to reduce the phase difference between two kinds of polarization caused by the temperature adjustment, thereby restraining PDL from deteriorating (see FIG. 4).

Preferably, the optical path length difference between the main optical path and auxiliary optical path is set such that not only the birefringence generated upon temperature adjustment effected by each of the heaters 131 to 134 but also that caused by the stress of the substrate 100 becomes smaller when transmissivity is lower, so as to reduce the phase difference between two kinds of polarization. Namely, letting B' be the birefringence caused by the stress of the substrate 100, and $\Delta L$ be the optical path length difference, the respective optical path lengths of optical paths are set so as to lower the absolute value of phase difference between two kinds of polarization represented by the equation of $$\Delta \varphi_{TM} - \Delta \varphi_{TE} = \frac{2\pi}{\lambda}(L_1 B_1 - L_2 B_2 + B' \Delta L) \quad (4)$$

when transmissivity is lower (optical loss is greater). Specifically, it is set such that $L_1 B_1 - L_2 B_2 + B' \Delta L$ can approach zero. In such a manner, even when the birefringence B' caused by the stress of the substrate 100 is too large to neglect, the birefringence fluctuation difference between the main optical path and auxiliary optical path is reduced, so that the phase difference between two kinds of polarization decreases, whereby PDL is restrained from deteriorating.

Preferably, the absolute value of the above-mentioned equation (3) is made as small as possible within the range where transmissivity is 0.2 or less. According to the above-mentioned equation (2), PDL becomes 0.21 dB or greater when the difference in transmissivity between two kinds of polarization is 0.01 while the transmissivity of each of the two kinds of polarization is 0.2 dB or less. However, since the phase difference between two kinds of polarization is canceled out in a range where transmissivity is 0.2 or less, PDL becomes 0.2 dB or less in a wide range of transmissivity values.

Without being restricted to the above-mentioned embodiment, the present invention can be modified in various manners. The optical device 1 of the above-mentioned embodiment is one in which the main optical path 110 and auxiliary optical path 120 are optically coupled to each other by three optical couplers 141 to 143, whereas temperature regulation effected by each of the heaters 131 to 134 is controlled so as to adjust the gradient of loss in light in a predetermined wavelength band from the optical input end 101 to the optical output end 102. However, the present invention is not restricted thereto. For example, the main optical path and auxiliary optical path may also be coupled to each other by two optical couplers or four or more optical couplers. Peltier devices may be employed in place of the heaters. Though the above-mentioned embodiment adjusts the gradient of loss in light in a predetermined wavelength band from the optical input end to the optical output end, it may be an optical attenuator for simply adjusting loss as well.

What is claimed is:

1. An optical device of Mach-Zehnder interferometer type comprising:

a main optical path for guiding light from an optical input end to an optical output end;

an auxiliary optical path disposed beside said main optical path;

first to third optical couplers for optically coupling said main and auxiliary optical paths to each other;

temperature adjusting means, disposed on said main and auxiliary optical paths between said first and second optical couplers and between said second and third optical couplers, for regulating respective temperatures of said optical paths; and control means for regulating an optical loss characteristic of transmitted light within a predetermined wavelength band in said main optical path by controlling respective amounts of temperature regulation effected by said temperature adjusting means;

wherein respective optical path lengths of said main and auxiliary optical paths are set such that birefringence generated upon temperature regulation effected by said temperature adjusting means becomes smaller when optical loss is greater.

2. An optical device according to claim 1, wherein said control means controls a gradient of optical loss of transmitted light within a predetermined wavelength band with respect to wavelength.

3. An optical device according to claim 1, wherein respective temperature adjusting means disposed on said main and auxiliary optical paths between said first and second optical couplers have the same configuration, and wherein respective temperature adjusting means disposed on said main and auxiliary optical paths between said second and third optical couplers have the same configuration.

4. An optical device control method for controlling an optical loss characteristic of the optical device according to claim 1, said method comprising the step of regulating said optical loss characteristic by controlling a difference in amounts of temperature regulation effected by respective temperature adjusting means on said main and auxiliary optical paths between said first and second optical couplers, and a difference in amounts of temperature regulation effected by respective temperature adjusting means on said main and auxiliary optical paths between said second and third optical couplers.

* * * * *